United States Patent
Lee et al.

(10) Patent No.: US 6,341,140 B1
(45) Date of Patent: Jan. 22, 2002

(54) CODE SYNCHRONIZATION APPARATUS OF MULTI-CARRIER DIRECT SEQUENCE SPREAD SPECTRUM COMMUNICATION SYSTEM

(75) Inventors: Dong Wook Lee; Hun Lee, both of Daejon-Shi (KR)

(73) Assignee: Electronics and Telecommunications Research Institute, Daejon (KR)

( * ) Notice: Subject to any disclaimer, the term of this patent is extended or adjusted under 35 U.S.C. 154(b) by 0 days.

(21) Appl. No.: 09/132,713

(22) Filed: Aug. 12, 1998

(30) Foreign Application Priority Data

Dec. 8, 1997 (KR) ............................................ 97-38475

(51) Int. Cl.$^7$ ............................ H04L 27/30; A61F 2/06
(52) U.S. Cl. ...................................... 375/130; 375/147
(58) Field of Search ................................. 375/130, 147

(56) References Cited

U.S. PATENT DOCUMENTS

| | | | |
|---|---|---|---|
| 5,570,350 A | * 10/1996 | Myer et al. | 370/18 |
| 5,640,424 A | * 6/1997 | Banavong et al. | 375/316 |
| 5,729,571 A | * 3/1998 | Park et al. | 375/206 |
| 5,982,819 A | * 11/1999 | Womack et al. | 375/316 |
| 6,061,385 A | * 5/2000 | Ostman | 375/130 |

OTHER PUBLICATIONS

Hiromasa Habuchi and Tsuyoshi Arai, Theoretical Analysis of M–ary/SSMA systems utilizing multicarrier techniques, IEEE 1997, pp. 84–88.*

Seung–Hoon Hwang, Kyoo–Jin Han, Yeog–Lee Chung and Keum–Chan Whang, Effects of the Parameters on the Performance of a Multi–carrier CDMA System in Fading Channel, IEEE 1997, pp. 1882–1886.*

Shiro Kondo and Laurence B. Milstein, Performance of Multicarrier DS CDMA Systems, Feb. 1996, pp. 238–246.

* cited by examiner

Primary Examiner—Stephen Chin
Assistant Examiner—Tony Al-Beshrawi
(74) Attorney, Agent, or Firm—Antonelli, Terry, Stout & Kraus, LLP

(57) ABSTRACT

A code synchronization apparatus in a multi-carrier direct sequence spread spectrum communication system and method thereof are disclosed. The purpose of the present invention is to solve the problems that when using the conventional code synchronization apparatus used in a single carrier system, the time necessary for synchronization as well as the complexity of the system are increased. To do this, the present invention discloses a code synchronization apparatus in a multi-carrier direct sequence spread spectrum communication system and method thereof which are capable of obtaining a stabilized code synchronization, using a code synchronization method suitable to the situation to adjust the symbol combining gain and the symbol integration period adaptively to the channel situation.

4 Claims, 3 Drawing Sheets

CODE SYNCHRONIZATION APPARATUS OF MULTI-CARRIER DIRECT SEQUENCE SPREAD SPECTRUM COMMUNICATION SYSTEM

BACKGROUND OF THE INVENTION

1. Field of the Invention

The present invention relates to a code synchronization in a direct sequence spread spectrum communication system. In particular, the present invention relates to a code synchronization apparatus in a multi-carrier direct sequence spread spectrum communication system and method thereof.

2. Description of the Prior Art

Typically, in a cellular and a personal mobile communication system, a code division multiple access communication method using a direct sequence spread spectrum is adopted. In these communication schemes, processing gain is defined as the ratio of the signal transmit bandwidth to the data rate, which determines a multiple access capacity. Therefore, methods for transferring a signal using wider bandwidth are required in order to increase the data rate with the same processing gain. A broadband CDMA communication is the one of those methods. In the broadband CDMA communication method, there are two methods. First, the method using the single carrier is the one to increase the data rate with the same processing gain by combining the data with the sequence with higher chip rate. To the contrary, the method using the multi-carrier is the one to transfer each of a plurality of carriers each having different frequencies, which modulate data spread by a sequence. In this case, the processing gain at each carrier frequency is less than the first method. However, if the signals received at carrier frequencies are combined coherently, the original processing gain can be restored since signal components are added coherently while noise components are added with random phases. Additionally, in a frequency selective fading channel, there is an advantage that it can obtain a frequency diversity gain. In the multi-carrier broadband direct sequence spread spectrum communication, there is an advantage that it can reduce a power consumption because it does not need a higher device even in processing a baseband signal in contract to the conventional single carrier system that needs to process a much higher baseband signal. Also, since it does not require continuous frequency bands in contrast to the single carrier system, it can increase the efficiency of frequency resources. However, the advantage of the multi-carrier direct sequence spread spectrum system can be obtained only if the phase of each carrier can be known exactly after code synchronization is completely established. Thus, since the phase of each carrier can not be known before the code synchronization is completely established, there is a need for a code synchronization method, which is capable of obtaining the diversity gain mentioned above when the phase of the carrier is not known.

However, a code synchronization system suitable to the characteristics of multi-carrier direct sequence spread spectrum system has not been developed. Only a method used in the single carrier direct sequence spread spectrum system can be employed. Even in this case, since each code synchronization has to be independently performed to the signal modulated into each carrier, there are disadvantages that the time necessary for the synchronization as well as the complexity of the system are increased as much as the number of the carrier used. Also, there is a disadvantage that the diversity gain cannot be obtained because the diversity of the received signal in a fading channel cannot be used.

SUMMARY OF THE INVENTION

It is therefore an object of the present invention to solve the problems involved in the prior art, and to provide a code synchronization apparatus of a multi-carrier direct sequence spread spectrum communication system and method thereof which are capable of obtaining a stabilized code synchronization, using a code synchronization method suitable to the situation to adjust the symbol combining gain and the symbol integration time depending on the channel situation.

In order to achieve the above object, the code synchronization apparatus in a multicarrier direct sequence spread spectrum communication system for synchronizing PN code in received signal with reference PN code locally generated in the receiver according to the present invention comprises a plurality of bandpass filter for filtering received signals at each carrier frequency so as to perform a code synchronization of the received signals; a plurality of amplifiers for amplifying the outputs of the bandpass filters; a plurality of automatic gain controlling means for controlling the gain of the amplifiers using the outputs of the amplifiers as inputs, so that the output magnitudes of the amplifiers have a constant value; a pseudo noise code generator for generating pseudo noise codes; a plurality of non-coherent correlators for performing non-coherent detection using the gain controlled signal and the output of the pseudo noise code generators; and a symbol combining and code synchronization test processor for commanding the pseudo noise code generator to generate pseudo noise codes and for combining and testing the output of the non-coherent correlators to determine whether or not the code is synchronized.

The receiver in a multi-carrier direct sequence spread spectrum system for modulating a plurality of carriers of different frequencies into direct sequence spread spectrum signals to transmit them according to the present invention comprises an interface apparatus for viewing surrounding topologies and speed to an user and for generating channel information from the view which is selected by the user, so as to perform in parallel the code synchronization of the received signal; and a system controller for receiving the channel information to calculate an integral time of the non-coherent correlators and the number of symbol to be combined, which are suitable to the channel information, and then commanding them to the each non-coherent correlator and a code synchronization test processor.

BRIEF DESCRIPTION OF THE DRAWINGS

The above object, and other features and advantages of the present invention will become more apparent by describing the preferred embodiment thereof with reference to the accompanying drawings, in which.

Similar reference characters refer to similar parts in the several views of the drawings.

DETAILED DESCRIPTION OF PREFERRED EMBODIMENTS

The present invention will be explained below in detail by reference to the accompanying drawings.

Figure 1:
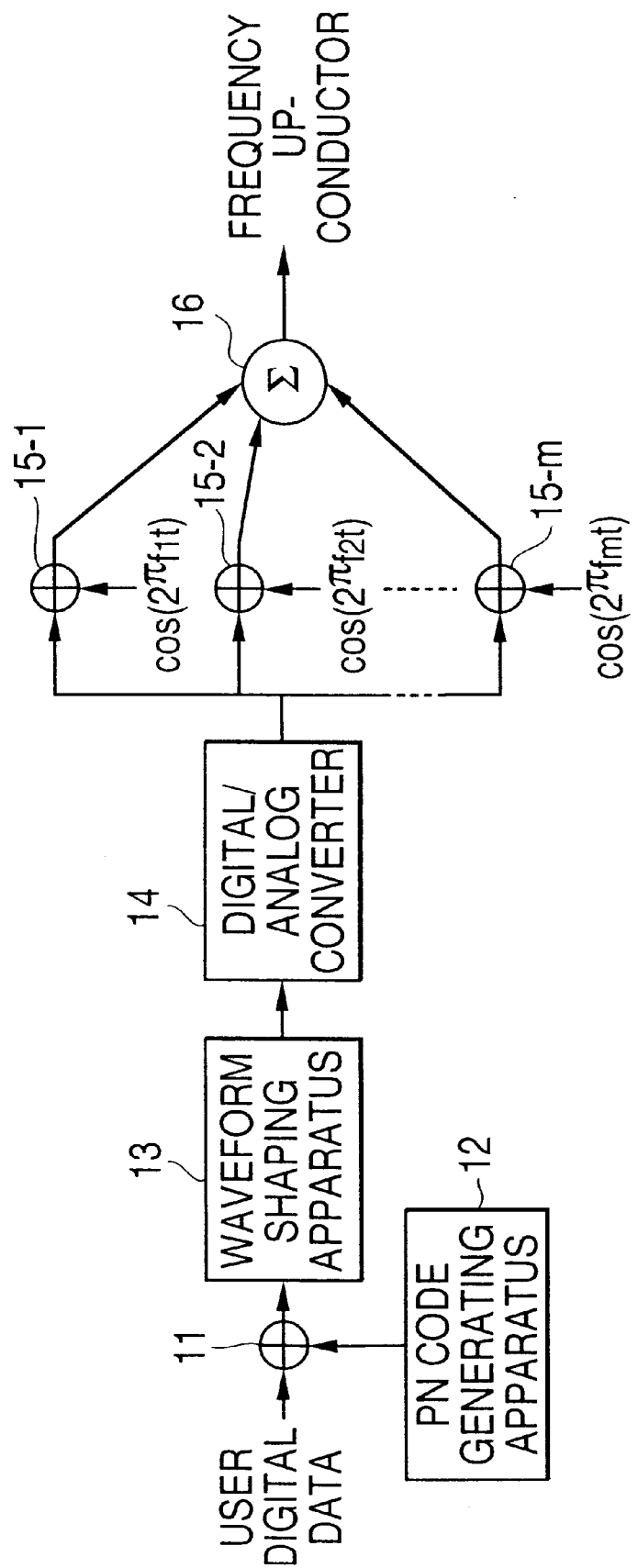
FIG. 1 shows a structure of a transmitter in a conventional multi-carrier direct sequence spread spectrum communication system.

FIG. 1 shows a structure of a transmitter in a conventional multi-carrier direct sequence spread spectrum communication system, in which the transmitter of the multicarrier direct sequence spread spectrum communication system for modulating the m different carriers is shown.

First, user digital data are combined with the output of a pseudo noise (hereinafter called PN) code generating apparatus 12 through the exclusive OR (EXOR) operation in a spectrum spread combiner 11 and then are spectrum spread. The waveform of the spectrum -spread signal is waveform-shaped in order to remove the interference between the neighboring channels in a waveform shaping apparatus 13. Then, as the waveform shaping apparatus, a finite impulse response (FIR) filter may be used. Thereafter, the waveform shaped signal is converted into an analog value in a digital/analog (D/A) converter 14 which then modulates each of the carriers ($\cos 2\pi f_1 t$, $\cos 2\pi f_2 t$, ..., $\cos 2\pi f_m t$) having a frequency $f_i$(wherein, i=1,2, ..., m) in the m mixers 15-1 to 15-m. After each of the modulated signals is added together at the combiner 16, it is transmitted to a frequency up-converter. Thereafter, the resulting signal is frequency-converted into a radio frequency and then transmitted to the receiver of the other party via an amplifier and an antenna.

Figure 2:
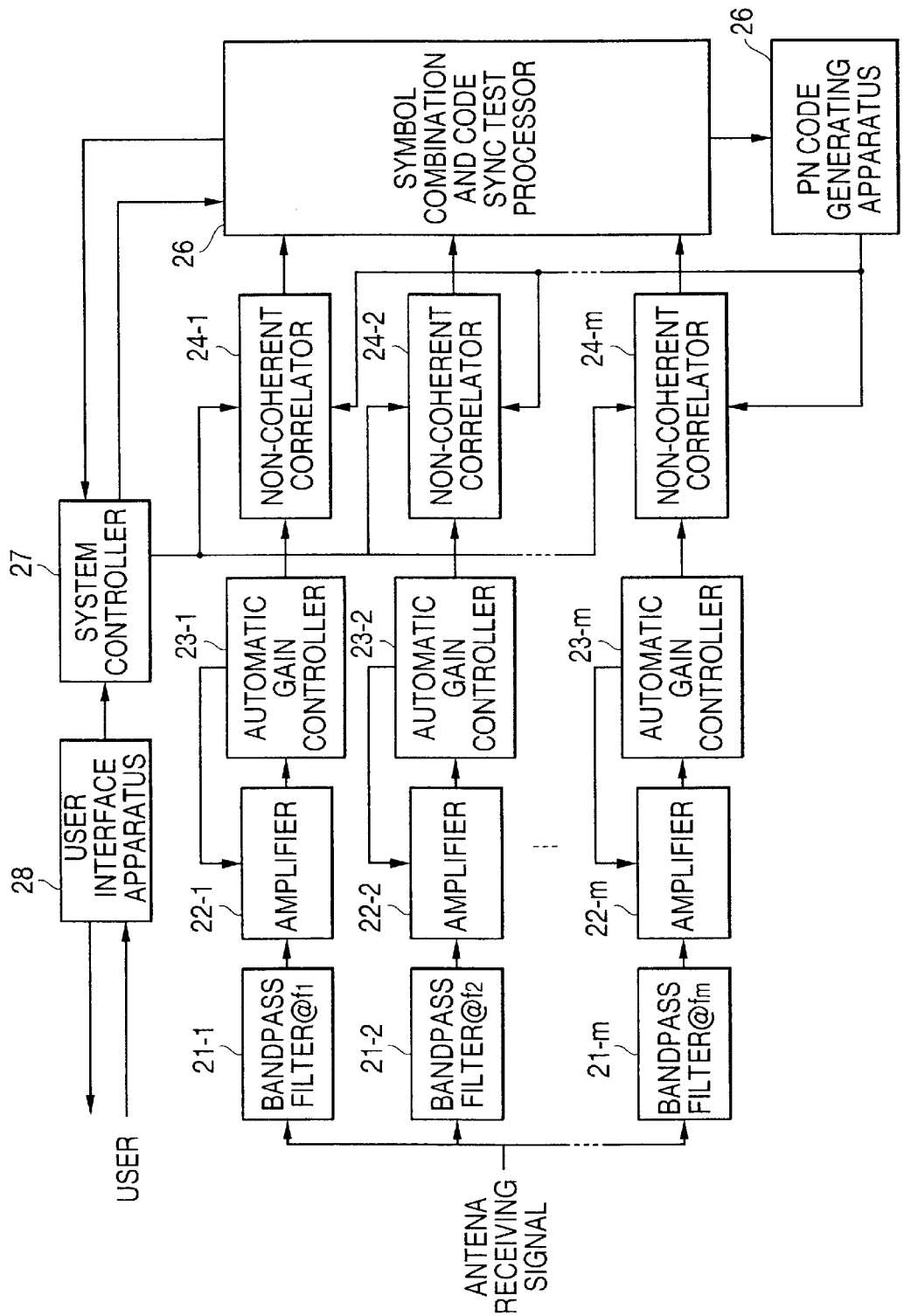
FIG. 2 shows a structure of a code synchronization device in a multi-carrier direct sequence spread spectrum communication system according to the present invention.

FIG. 2 shows a structure of a code synchronization device in a multi-carrier direct sequence spread spectrum communication system according to the present invention.

The signals received through the antenna are inputted to the m bandpass filters 21-1 to 21-m in which the center frequency of each bandpass filter is positioned at the corresponding carrier frequency. The bandwidth of the bandpass filters 21-1 to 21-m is set to the range to the extent to pass only the bandwidth of each carrier so as to detect the strength of the signal received at each frequency. The m signals filtered at the bandpass filters are amplified through the m amplifiers 22-1 to 22-m, respectively. The gains of the signal amplified at the amplifiers 23-1 to 23-m are inputted to the m automatic gain controllers 23-1 to 23-m, respectively, in which then the gain values outputted from the amplifiers 22-1 to 22-m are compare with the setting values. Thereafter, it calculates a new gain value so that the output magnitude of each of the amplifiers can maintain its setting value, and then transfers the new gain value to the amplifier.

The signals of which the gains are controlled via the amplifiers 22-1 to 22-m and the automatic gain controllers 23-1 and 23-m are inputted to the m non-coherent correlators 24-1 to 24-m. The non-coherent correlators 24-1 to 24-m combine the in-phase and quadrature components of the inputted signals with the outputs of the PN code generating apparatus 25 at its receive end thereby to perform a non-coherent detection procedure.

After the non-coherent detection is performed, the outputs of the m non-coherent correlators 24-1 to 24-m are inputted to a symbol combining and code synchronization test processor 26. Then, the symbol combining and code synchronization test processor 26 receives symbols to be combined from the system controller 27. Then, it determines the phase of the PN code to be inputted to each of the non-coherent correlators 24-1 to 24-m from this information and then transmits it to the PN code generating apparatus 25.

For example, for the case when m is 4 and the number of symbol received from the system controller 27 is 4, the operation of the code synchronization system is as follows:

First, the symbol combining and code synchronization test processor 26 commands the PN code generating apparatus 25 to input the same PN code into the four non-coherent correlators 24-1 to 24-4. Also, if the number of symbols to combine which was received from the system controller 27, it commands the PN code generating apparatus 25 to input PN codes of a first and second phase each of which has two different phases into the non-coherent correlators 24-1, 24-2 and 24-3, 24-4, respectively.

The system controller 27 also determines an integral period of the integral and dump apparatus (reference numerals 35-$i$1 and 35-$i$2 in FIG. 3) in the non-coherent correlators 24-1 to 24-m in inverse proportion to the number of symbol to be combined. The reason for determining the integral period is as follows: In the case when the characteristic of respective sub-channels is the same to that of the additive white Gaussian channel, since the gain by the symbol combining is so small, the symbol combining does not need to be performed. Therefore, in order to perform a fast code synchronization, the integral period has to be long enough because the non-coherent correlators 24-1 to 24-m each use different PN phases, respectively, to perform a parallel detection for performing the code synchronization. Also, in the case when each subchannel varys fully independently, it is preferred that the number of symbol combining large enough to obtain a SNR (signal-to-noise ratio) gain by the symbol combining, instead the integral period is controlled to be small so as to increase the synchronization speed.

To help the system controller 27 determining this integral period, the user provides the system controller 27 with information on the channel via the user interface apparatus 28 provided by the system. The user interface apparatus 28 presents to user information such as topologies of a metropolitan area (an open area or an mountain area) and its speed, using a menu to present selection items. Then, the user selects information on the channel and then inputs transmits it to the system controller 27.

Figure 3:
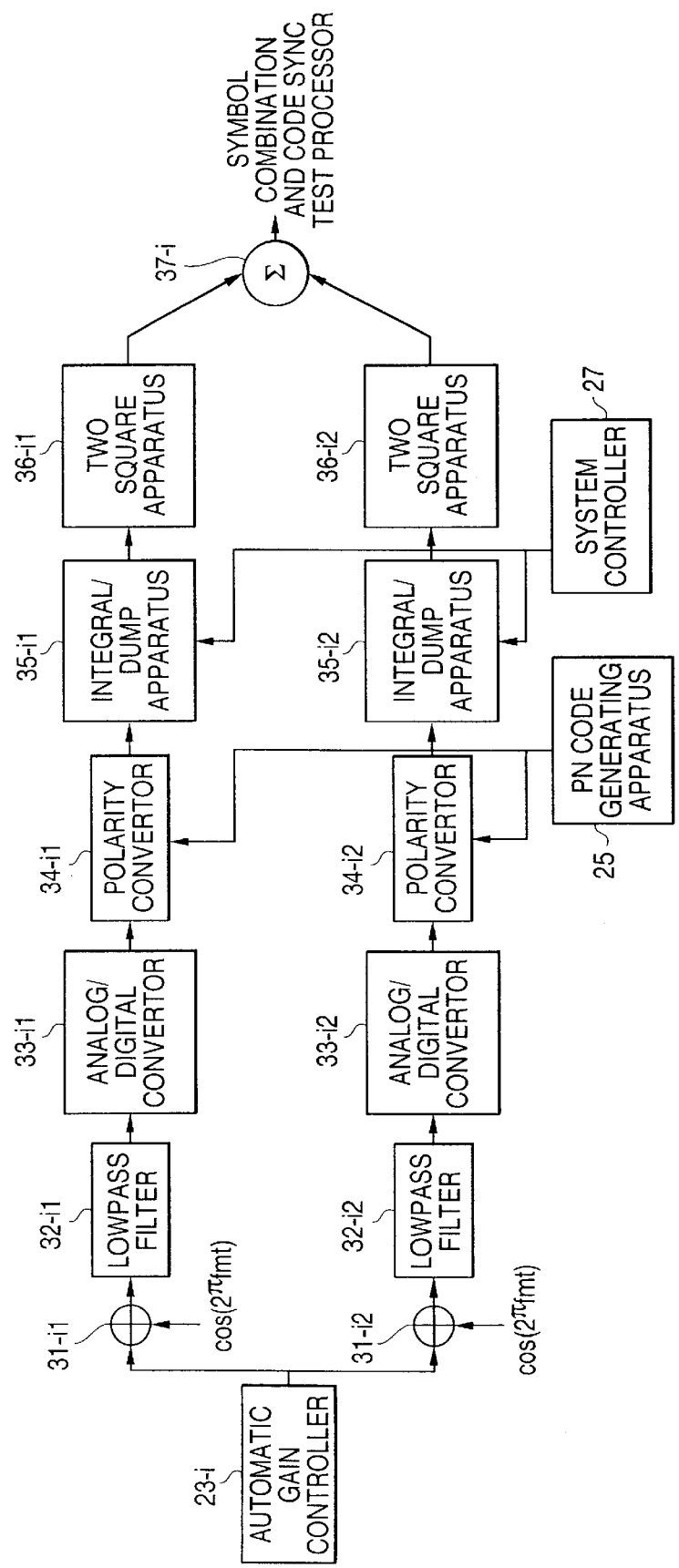
FIG. 3 shows a structure of a non-coherent correlator within a code synchronization apparatus in a multi-carrier direct sequence spread spectrum communication system according to the present invention.

FIG. 3 shows a structure of a non-coherent correlator of a code synchronization apparatus in a multi-carrier direct sequence spread spectrum communication system according to the present invention.

The outputs of the i-th automatic gain controller 23-$i$ among the automatic gain controllers 23-1 to 23-m in FIG. 2 is multiplied by outputs of two local oscillators. Their center frequencies are fin and their phase differences are 90° (in the two mixers 31-$i$1 and 31-$i$2). Since the carrier phase of the received signal is not known, the signal the phase difference of which is 90° is used to perform a non-coherent detection. Thereafter, the outputs of the two mixers 31-$i$1 and 32-$i$2 pass through the two lowpass filters 32-$i$1 and 31-$i$2, respectively, so that they can be converted into two baseband signals. Then, the two baseband signals are sampled every PN chip period and converted into digital binary signals in each of the analog/digital (A/D) converter 33-$i$1 and 33-$i$2. Next, received signals are inputted into the polarity converters 34-$i$1 and 34-$i$2, in which output different values depending on the outputs of the PN code generating apparatus (reference numeral 25 in FIG. 2). In other words, if the output of the PN code generating apparatus is 1, the polarity converters 34-$i$1 and 34-$i$2 output the inputted digital binary signals the polarities of which are inverted, and if the output of the PN code generating apparatus is 0, they output the polarities of the inputted digital binary signals without change. By doing so, it can output the same value to the multiplication of the input signal to the NRZ (non-return-to-zero) converted output of the PN code generating apparatus 25 in FIG. 2.

The integral and dump apparatus 35-$i$1 and 35-$i$2 continue to accumulate the input values during the integration period specified by the system controller 27 in FIG. 2. However, when the specified integral period is reached, it outputs an accumulated value and then initiates the accumulated value to 0 for a new integration. Since the integral and dump apparatus 35-*i*1 and 35-*i*2 keep the previous output values until they output a new integral result, they output the same value during the integral period specified by the system controller 27 in FIG. 2. Thus, since the integral period can be controlled by the code synchronization system controller 27 in FIG. 2, a code synchronization can be adjusted adaptively the channel condition. Then, the two square apparatus 36-*i*1 and 36-*i*2 read once the outputs of the two integral and dump apparatus 35-*i*1 and 35-*i*2 at the integral time specified by the system controller 27 in FIG. 2 and then calculate the square of the read value to output the result. Thereafter, the outputs of the two square apparatus 36-*i*1 and 36-*i*2 are added at the combiners 37-*i*, thus obtaining the magnitude of the correlation relationship between the final input signal and the output of the basic PN code generating apparatus 25 in FIG. 2. The outputs of the combiners 37-*i* are inputted to the symbol combination and code synchronization test processor 26 in FIG. 2.

As described above, according to the present invention, since the symbol combining gain and the integral period can be controlled depending on the channel situation and thereby the code synchronization method suitable to the situation thereof can be used, the present invention provides the advantages in that it can obtain the diversity for each of frequencies because it can set up a more stabilized code synchronization than the single carrier direct sequence band spread system and can also use the diversity of the received signal at the fading channel.

While the present invention has been described and illustrated herein with reference to the preferred embodiment thereof, it will be understood by those skilled in the art that various changes in form and details may be made therein without departing from the spirit and scope of the invention.

What is claimed is:

1. A code synchronization apparatus in a multi-carrier direct sequence spread spectrum communication system for synchronizing pseudo noise codes in received signals with reference pseudo noise codes locally generated in a receiver, comprising:

a plurality of bandpass filter for filtering received signals at each carrier frequency so as to perform a code synchronization of said received signals;

a plurality of amplifiers for amplifying the outputs of said bandpass filters;

a plurality of automatic gain controlling means for controlling the gain of said amplifiers using the outputs of said amplifiers as inputs, so that the output magnitudes of gain controlled signals have a constant value;

a pseudo noise code generator for generating pseudo noise codes;

a plurality of non-coherent correlators for performing non-coherent detection using said gain controlled signals and the pseudo noise codes; and a symbol combining and code synchronization test processor for commanding said pseudo noise code generator to generate the pseudo noise codes, and for combining and testing the output of said non-coherent correlators to determine whether there is code synchronization.

2. The code synchronization apparatus as claimed in claim 1, further comprising:

a user interface for presenting selection items including topologies and speed to an user, and for generating channel information based on selection items selected by the user; and a system controller for receiving said channel information to calculate an integral time of said non-coherent correlators and a number of symbols suitable to said channel information, and for commanding the integral time of said non-coherent correlators and the number of symbols to each of said non-coherent correlators and said symbol combining and code synchronization test processor respectively.

3. The code synchronization apparatus as claimed in claim 1, wherein said non-coherent correlators combine in-phase and quadrature components of said gain controlled signals with said pseudo noise codes to perform said non-coherent detection.

4. The code synchronization apparatus as claimed in claim 2, wherein said non-coherent correlators each comprises:

mixers arranged to combine respective gain controlled signals with phase-difference local frequency signals to produce mixed signals;

low-pass filters arranged to filter said mixed signals and produce baseband signals;

converters arranged to sample said baseband signals at every pseudo code (PN) period and convert said baseband signals into binary signals;

polarity converters arranged to invert polarities of said binary signals based on said pseudo nose codes;

integral and dump devices arranged to accumulate input values from said polarity converters during the integral time and produce accumulated values, square devices arranged to calculate the square of said accumulated values and produce square values; and an adder arranged to obtain the magnitude of a correlation relationship between said square values and said pseudo noise codes and produce an output to said symbol combining and code synchronization test processor.

* * * * *